(12) United States Patent
Scott et al.

(10) Patent No.: US 7,209,865 B2
(45) Date of Patent: Apr. 24, 2007

(54) METHOD AND SYSTEM FOR REMOTELY PROCESSING VOLUMETRIC DATA

(75) Inventors: Robert C. Scott, Richardson, TX (US); Matthew M. Housey, Dallas, TX (US); L. Scott Hazlewood, Bonham, TX (US); Kenneth E. Stephens, Bonham, TX (US)

(73) Assignee: Fueling Technologies, Inc., Woodinville, WA (US)

( * ) Notice: Subject to any disclaimer, the term of this patent is extended or adjusted under 35 U.S.C. 154(b) by 0 days.

(21) Appl. No.: 11/027,382

(22) Filed: Dec. 29, 2004

(65) Prior Publication Data

US 2006/0142974 A1  Jun. 29, 2006

(51) Int. Cl.
*G06F 15/00* (2006.01)

(52) U.S. Cl. ...................................... 702/188
(58) Field of Classification Search ............... 702/188
See application file for complete search history.

(56) References Cited

U.S. PATENT DOCUMENTS

| | | | |
|---|---|---|---|
| 2,342,696 A | 2/1944 | Röver | |
| 4,244,218 A | 1/1981 | Wohrl | |
| 4,890,492 A | 1/1990 | Andrejasich | |
| 4,945,756 A | 8/1990 | Lewis et al. | |
| 5,016,197 A * | 5/1991 | Neumann et al. | 702/188 |
| 5,132,923 A | 7/1992 | Crawford et al. | |
| 5,156,042 A | 10/1992 | Carlin et al. | |
| 5,157,968 A | 10/1992 | Zfira | |
| 5,265,032 A * | 11/1993 | Patel | 702/188 |
| 5,373,346 A * | 12/1994 | Hocker | 702/188 |
| 5,614,672 A | 3/1997 | Legendre et al. | |
| 5,619,560 A * | 4/1997 | Shea | 379/106.04 |
| 6,202,486 B1 | 3/2001 | Kemp | |
| 6,662,643 B1 | 12/2003 | Scott et al. | |
| 6,834,544 B2 | 12/2004 | Scott et al. | |
| 6,892,158 B2 * | 5/2005 | Kojima et al. | 702/127 |
| 2005/0083197 A1 * | 4/2005 | Glenn et al. | 340/539.22 |
| 2005/0171734 A1 * | 8/2005 | Dropik | 702/182 |

* cited by examiner

*Primary Examiner*—John Barlow
*Assistant Examiner*—Jonathan Moffat
(74) *Attorney, Agent, or Firm*—Christensen O'Connor Johnson Kindness PLLC

(57) ABSTRACT

In accordance with an aspect of the present invention, a system for providing storage tank measurements to a remote location is provided. The system includes a control box configured to take a plurality of readings from within the storage tank and transmit those readings to a master computer. The master computer is configured to receive and store the plurality of readings, and in response to receiving a request for a measurement for the storage tank, calculate the requested measurement utilizing the received readings. The calculated measurements are then transmitted to the device requesting the measurements.

30 Claims, 16 Drawing Sheets

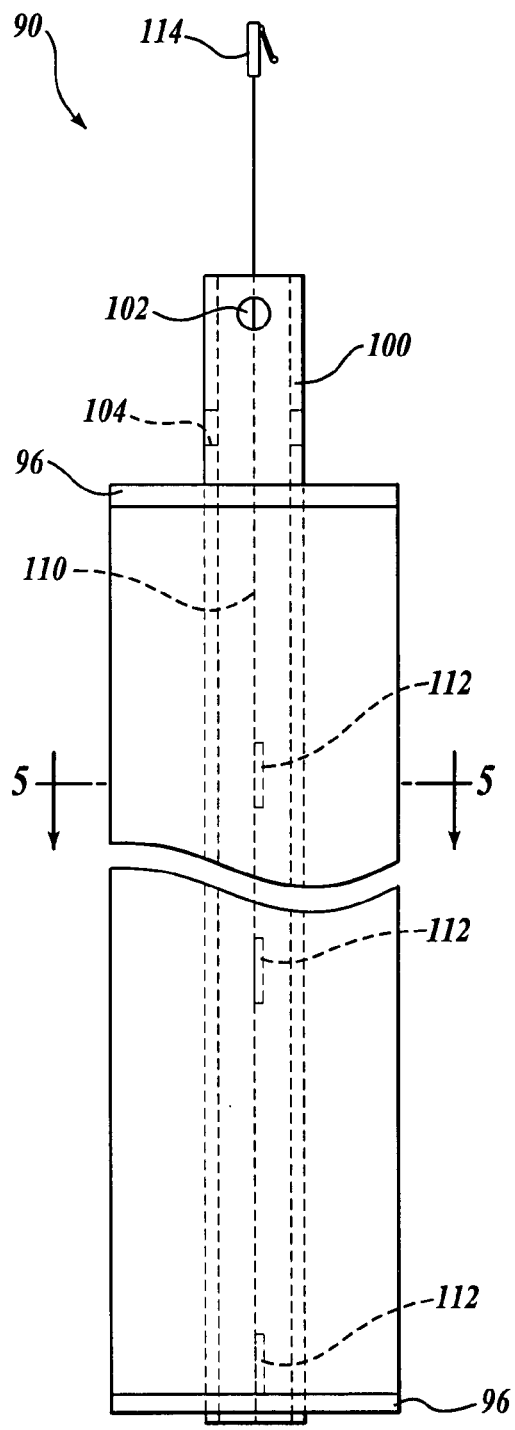
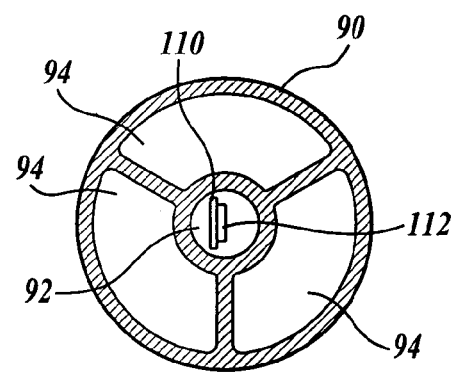
Fig.5.
Fig.4.

```
15125307055
MAXIMUM NUMBER OF TANKS: 03
SOFTWARE VERSION: V5.00.02

MASTER SERIAL NUMBER: 03030002;
NUMBER OF TANKS: 03;
TANK NUMBERS: 01,02,03;
UNITS: 1;
MODEM RINGS: 3;
PASSWORD: 0000;

TANK NUMBER: 01;
TANK SERIAL NUMBER: 08031013;
HANGER ASSY AMP 'M': 249.954391;
HANGER ASSY AMP 'B': 140.289810;
HANGER ASSY SERIAL NUMBER: 00E33252;
HANGER ASSY 'M': 0.045600;
HANGER ASSY 'B': -0.045500;
HANGER ASSY TEMP FACT 'M': 0.000000;
HANGER ASSY TEMP FACT 'B': 0.000000;
PRESSURE SENSOR SERIAL NUMBER: 3A000335;
PRESSURE SENSOR 'M': 14.968310;
PRESSURE SENSOR 'B': -0.208760;
FIELD CALIBRATION : 0.500;
TANK TYPE: 1;
DIMENSION 'A' (TANK DIAMETER1): 108.17;
DIMENSION 'B': (TANK DIAMETER2): 0.00;
DIMENSION 'C' (TANK LENGTH): 380.03;
DIMENSION 'E'(ENDCAP RADIUS): 54.34;
FUEL TYPE: 1;
SPECIFIC GRAVITY: 0.5050;
WAKEUP INTERVAL: 01;
TANK TILT: 0.000;
TANK ROTATION: 0.0000;
WELD TO PROBE: 0.00;
PROBE WEIGHT: 8.508;
WEIGHT OF PROBES: 8.508;
WEIGHT OF UNIVERSAL COUPLINGS: 0.000;
WEIGHT OF DROP TUBE: 0.000;
OFFSET MEASUREMENT: 2.500;
PROBE LENGTH: 104.000;
DIMENSION 'D' (INSIDE DIAM): 114.250;
DROP TUBE LENGTH: 0.000
HANGER ASSEMBLY PART NUMBER: 027001100;
PROBE 1 PART NUMBER: 02500189;
PROBE 2 PART NUMBER:;
...
COUPLING 1 PART NUMBER:;
...
NUMBER OF REPEATERS: 0;
REPEATER LIST:;

TANK NUMBER: 2
```

Fig.17.

METHOD AND SYSTEM FOR REMOTELY PROCESSING VOLUMETRIC DATA

FIELD OF THE INVENTION

In general, the present invention relates to storage tank measurements and, in particular, to a system and method for efficiently measuring, reporting and storing measurements taken from within a storage tank.

BACKGROUND OF THE INVENTION

Storage tanks for liquefied hydrocarbon products such as butane and propane present special problems for the safe and ready monitoring of tank volume levels. This is particularly so where the tanks are located in remote or relatively inaccessible locations, making tank inspections inefficient and inconvenient.

Liquid Propane ("LP") gas storage tanks are classified as explosion hazards by the National Fire Protection Association, requiring special care in the design and installation of any ancillary equipment. The LP Gas Code (NFPA 58) defines the area within 5 feet of any tank, fill opening or point where LP gas is dispensed, loaded, vented or the like as a Class I, Division 1, Group D hazard.

Despite the daunting nature of the problems involved in safely installing a volume monitor for such a tank, it would be desirable to provide a system and method for remotely reading volume levels so that fuel supplies can be accurately maintained in adequate amounts without the necessity of site trips to ascertain the amount of fuel on hand.

It is known in the measuring art to determine the weight of liquid contents in a tank by suspending a buoyant probe in the liquid from a load cell to measure the apparent weight of the probe. Examples of such systems in the prior patent art may be found in U.S. Pat. Nos. 5,614,672, 5,157,968, 5,132,923, and 4,244,218.

U.S. Pat. No. 5,157,968 discloses a buoyant displacement probe mounted through a top tank port via a load cell for the determination of the liquid tank content weight. It also provides a second buoyant probe mounted via a load cell through a second tank port, so that the specific gravity of the liquid may be calculated from the second load cell reading and the content weight can thus be converted to a volume. U.S. Pat. No. 5,614,672 likewise determines content weight by a load cell-mounted buoyant displacement probe. It, however, relies for volume determination on an assumption that the specific gravity of the liquid in the tank is a constant, known value.

Despite these efforts to provide tank monitors employing buoyant displacement probes for monitoring tank contents, there remains a lack of a suitable system and method for accurately and efficiently reading, monitoring and storing in-tank readings from a remote location. Accordingly, there is a need for a system and method that provides the ability to remotely monitor and track information about a storage tank from a remote location.

SUMMARY OF THE INVENTION

As will be described in more detail below, embodiments of the present invention provide a system and method for effectively and efficiently reading transmitting and storing measurements taken from within storage tanks. Additional, embodiments of the present invention provide the ability to remotely view measurements regarding those tanks from a remote location.

In accordance with a first aspect of the present invention, a method for transmitting readings taken from within a storage tank is provided. To accomplish that method a control box is activated at a predetermined time and, upon activation, takes a plurality of readings. Those readings are transmitted from the control box and after transmission a determination is made as to whether a response acknowledging the transmission was received. If a response acknowledging the transmission is received, the control box returns to a power saving state. If no response is received after a predetermined number of re-transmissions, the control box returns to a power saving state.

In accordance with another aspect of the present invention, a system for providing storage tank measurements to a remote location is provided. The system includes a control box configured to take a plurality of readings from within the storage tank and transmit those readings to a master computer. The master computer is configured to receive and store the plurality of readings, and in response to receiving a request for a measurement for the storage tank, calculate the requested measurement utilizing the received readings. The calculated measurements are then transmitted to the device requesting the measurements.

In accordance with still another aspect of the present invention, a computer system having a computer-readable medium including a computer-executable program therein for performing the method of remotely presenting a measurement taken from within a storage tank is provided. The computer system is capable of receiving a request to view a measurement for a storage tank and determine if the requested measurement is stored at a first location. If it is determined that the measurement is not stored at a first location, the computer system transmits the request to a second location and receives a response to the transmission including the requested measurement. The received measurement is then stored and displayed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a plan view of the displacement probe and temperature probe of the device of FIG. 1, taken at right angles to the depiction of the probe in FIG. 1;

FIG. 5 is a horizontal cross-section taken along line 5—5 in FIG. 4;

FIG. 17 is a block diagram of a configuration file containing information about monitored tanks and the in-tank sensors, in accordance with an embodiment of the present invention.

DETAILED DESCRIPTION OF THE PREFERRED EMBODIMENT

Figure 1:
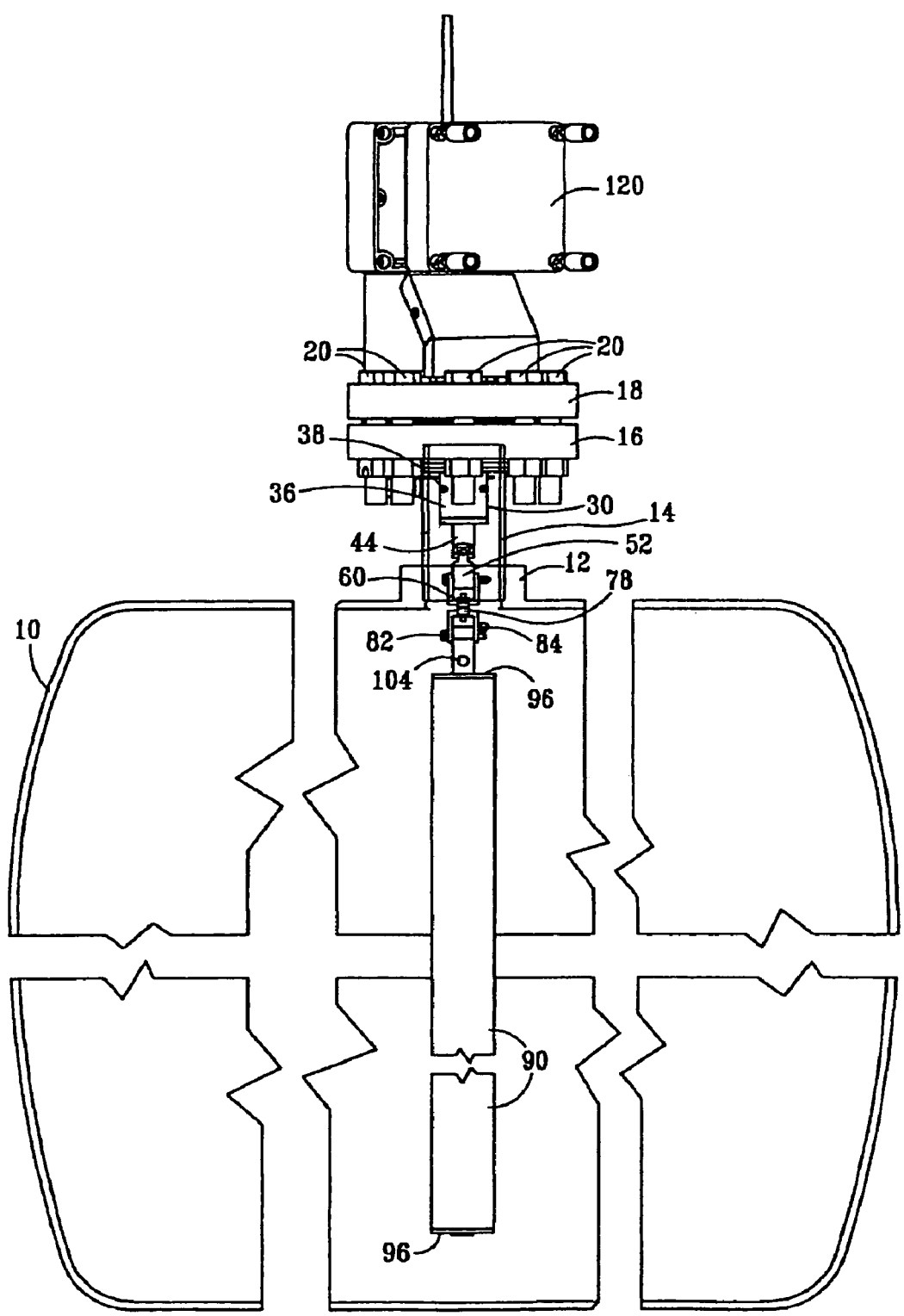
FIG. 1 is a plan view of a monitor constructed in accordance with this invention mounted on a pressurized tank.

As illustrated in the drawings, a storage tank 10 for liquefied propane, butane or similar hazardous liquid is provided with a monitoring apparatus constructed in accordance with the invention by installation through a single top port 12. Existing tanks are conventionally provided with a port having a two inch diameter, and the preferred form of apparatus of this invention may be readily and safely installed in such a pre-existing port.

A threaded riser pipe 14 is secured and sealed in port 12, and extends above the port a few inches. Typically, pipe 14 may be about six inches in length. A heavy-duty flange 16 is threaded and sealed to riser 14. The flange may be provided with a circular array of eight bolt holes. A flange gasket and flange cover 18 having conventional pressure-proof electrical cable pass-through is secured to flange 16 by conventional means such as bolts 20 to close the port 12 in a sealed, pressure-proof fashion.

Figure 2:
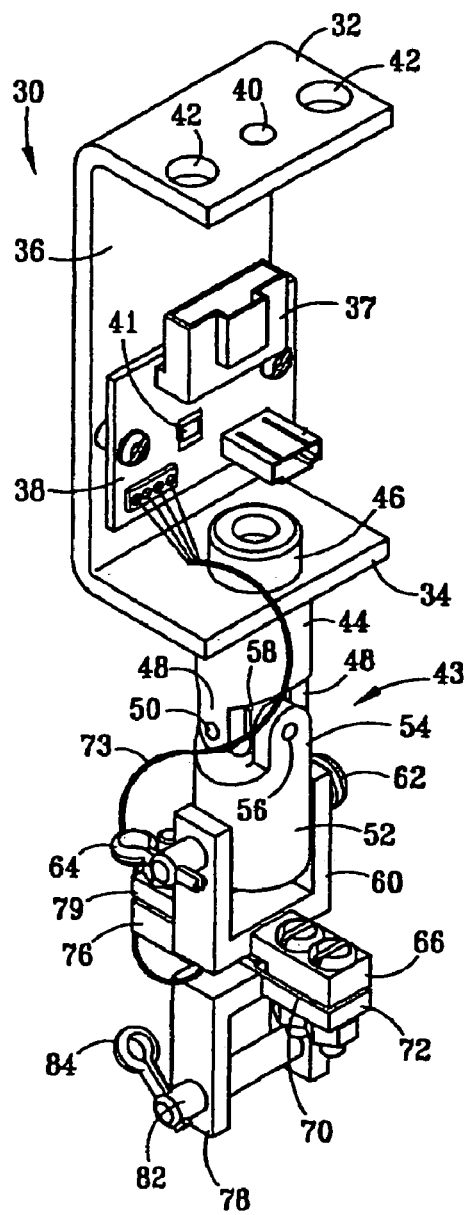
FIG. 2 is a perspective view of the hanger bracket, universal joint assembly and load cell of the device of FIG. 1.
Figure 3:
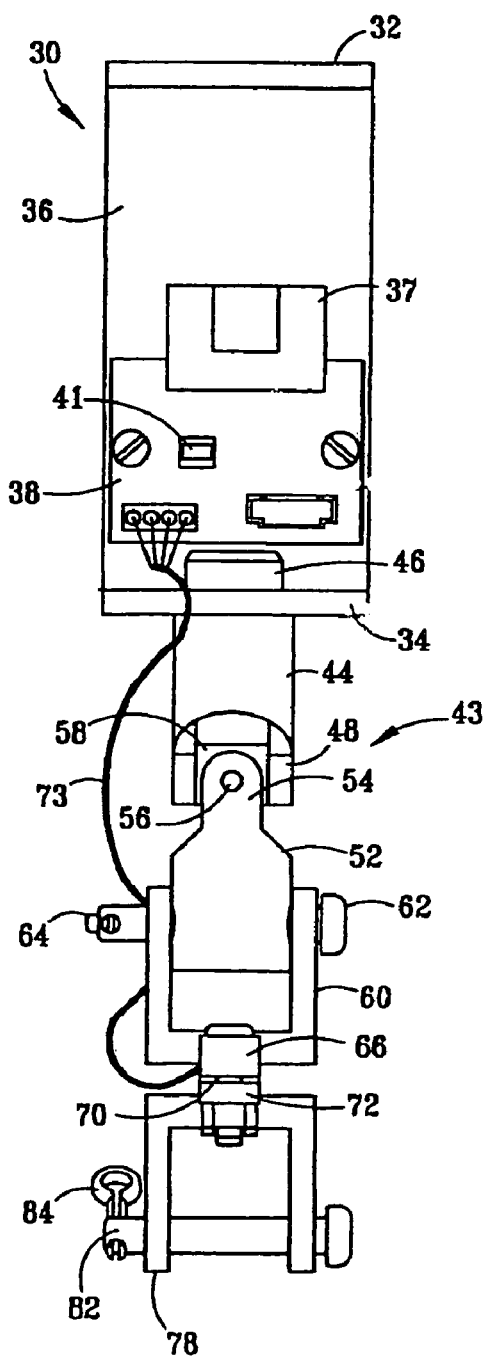
FIG. 3 is a plan view of the portion of the apparatus shown in FIG. 2.

A hanger bracket 30, described in detail with respect to FIGS. 2 and 3, is provided for suspending the in-tank elements of the apparatus. Hanger bracket 30 has an upper flange 32, a lower flange 34, and a vertically extending web 36 connecting the flanges 32 and 34. A circuit board 38 is mounted on web 36. The details of construction of board 38 are conventional. Board 38 is provided with a plug 37 for connecting to the cabling of the pass-through flange cover 20 (FIG. 1) to communicate the data received by board 38. Web 36 also carries a temperature sensor 41 for measuring the vapor temperature in the upper portion of the tank, connected to circuit board 38. This permits temperature compensation of data from the load cell, as described below. An aperture 40 (FIG. 2) is provided in upper flange 32 for alignment with the pressure measuring port of the flange cover 18 (FIG. 1) for measuring tank pressures. Upper flange 32 also has a pair of mounting holes 42 for bolting bracket 30 securely to flange cover 18. Disposed within the pressure measuring port is a pressure measuring sensor (not shown) for measuring the pressure within the storage tank.

A universal joint assembly 43 (FIGS. 2 AND 3) is suspended below hanger bracket 30. The assembly 43 may be any suitable commercially available universal joint assembly, such as Part Number 64565K1 from McMaster-Carr Supply Company, depicted here. The upper body 44 of assembly 43 is secured to the lower face of flange 34 by bolt 46. A pair of spaced legs 48 extend downwardly from upper body 44, and carry an upper horizontal pivot pin 50. The lower body 52 of assembly 43 has upwardly extending spaced legs 54 which carry a lower horizontal pivot pin 56. Pins 50 and 56 are oriented so that the vertical planes through their axes are mutually perpendicular. Each of the pins 50 and 56 extend through a pivoting central body 58 of the universal joint assembly 43, positioned between legs 48 and 54. This arrangement permits lower body 52 to hang vertically plumb from pin 56, even if the lower flange 34 of hanger bracket 30 is not oriented horizontally because of a tilt in the tank 10, the tank port 12, or for any other reason.

An upper load cell-mounting u-bracket 60 is secured to the universal joint assembly 43 at its lower body 52 by means of a clevis pin 62 secured by a cotter pin 64. U-bracket 60 has a horizontal leg 66 extending therefrom. One end of a load cell 70 (FIGS. 2 and 3) in the form of a planar beam sensor is secured to leg 66 by means of a first compression clamp 72. The opposite end of load cell 70 is secured to leg 76 of lower u-bracket 78 by second compression clamp 79. Thus, downward force on lower u-bracket 78 will produce an electrical signal from planar beam sensor load cell 70 which measures the magnitude of the force. The wiring harness 73 of planar beam sensor load cell 70 is connected to circuit board 38. As will be appreciated by one of skill in the relevant art, other types of load cells may be used with embodiments of the present invention. For example, an "S" type load cell may be used instead of a planar beam sensor load cell.

The effect of universal joint assembly 43 is to insure that planar beam sensor load cell 70 and the probe 90 (FIG. 4) are oriented horizontally. This eliminates the need for measurement and correction for any variation of the load cell 70 from the horizontal. Were the cell 70 permitted to be oriented out of horizontal, its measurements of force would be reduced by the sine of the angle of deviation. Universal joint assembly 43 eliminates this source of error, and the necessity of compensation.

Lower u-bracket 78 is provided with a clevis pin 82 secured by cotter pin 84 for mounting a buoyant displacement probe 90 (FIG. 4). Probe 90 may be a hollow tubular aluminum extrusion, and includes a vertically extending central passage 92 (FIG. 5), as well as vertically extending side chambers 94 provided to lighten probe 90 and increase its buoyancy. Annular covers 96 are secured to each end of probe 90 to close chambers 94 while leaving central passage 92 open to the liquid contents of tank 10. A mounting neck 100 (FIG. 4) extends from the upper end of probe 90, and is provided with a through-hole 102 for receiving the clevis pin 82 to suspend probe 90 from lower u-bracket 78. A second through-hole 104 also shown on FIG. 1 is provided in neck 100, 50 that a screwdriver or the like may be placed therethrough to support probe 90 on the riser pipe 14 during installation, while the installer makes the wiring connections to circuit board 38.

Probe 90 houses a flexible temperature probe string 110 which passes downwardly through open central passage 92. A plurality of temperature sensors 112 are spaced along temperature probe string 110 (FIGS. 4 and 5) for measuring the temperature of the liquid contents at spaced levels. In the preferred embodiment, the temperature sensors 112 (FIG. 4) are spaced so that they are suspended at the 5%, 35% and 65% of tank height levels within the tank. Each temperature sensor 112 communicates separately with a signal connector 114 located at the upper end of temperature probe string 110. Connector 114 plugs into circuit board 38 at temperature plug-in 39. This plug-in connection is adequate to support the temperature probe string 110, because of its light weight. The temperature sensor 41, the plurality of temperature sensors 112, the pressure sensor, and the load cell, each of which are located within the storage tank will be collectively referred to herein as "in-tank sensors." As will be appreciated by one of relevant skill in the art, additional or fewer sensors than those discussed herein may be included in the in-tank sensors.

A control box 120 (FIG. 1) secured atop the flange, controls when readings are to be taken from the in-tank sensors. The control box, at predetermined time intervals ("wake interval") powers up a microprocessor located within the central box, turns on an excitation voltage, and takes a predetermined number of readings from each of the in-tank sensors, and then powers down until the next wake interval. As discussed below, the wake intervals may be adjusted. In taking the readings, the control box records the analog values from the in-tank sensors a predetermined number of times, in an actual embodiment 4,096 times, totals and averages those readings. The readings that are taken from the in-tank sensors include, but are not limited to, the weight of the probe (in analog to digital converter ("A/D") counts); if an LPG tank, the absolute pressure (in A/D counts); if an above ground storage tank (AST), readings from water level sensors (in A/D counts); and four temperature readings (one from temperature sensor 41, and three from the plurality of temperature sensors 112). In taking the readings, the analog voltages are amplified and converted to digital values using a series of amplifiers and an analog-to-digital converter ("A/D converter"), as discussed in more detail with respect to FIG. 13.

Control box 120 also houses a radio frequency transmitter/receiver which can transmit the averaged readings to a master computer. In an actual embodiment, the data is transmitted using a 916.5 MHz (ISM Band) radio using On-Off Keying. In such an embodiment, the data rate may be 2,400 bps and Manchester encoded. This eliminates the need for a power hook-up within the hazardous area of the tank, as the microprocessor and radio may be conveniently operated on safe battery power. In alternative embodiments, the recording and transmission of readings may be accomplished using other forms and techniques. Readings may be transmitted from the control box 120 via a wired connection or using a wireless connection over another frequency than that mentioned above. For example, the radio of the control box may be a frequency hopping, spread spectrum radio, utilizing a three pass transmission, bit averaging, and Golay forward error correction. The data rate may be 9,600 bps and Gaussian frequency shift keyed. Additionally, the control boxes may be powered by other means, such as from a current source or solar powered.

The transmission itself may be packetized or serialized. In an actual embodiment, the data may be transmitted with an inclusion of an address (serial number) of the transmitting control box 120, the number of bytes being transmitted, the actual readings themselves, the number of transmission retries, in the event there was an initial transmission failure, and a cyclic redundancy check (CRC-16). The transmitted readings may include those referenced above plus a fifth temperature reading taken from a temperature sensor located on the control unit 120 is outside of the storage tank.

Figure 6:
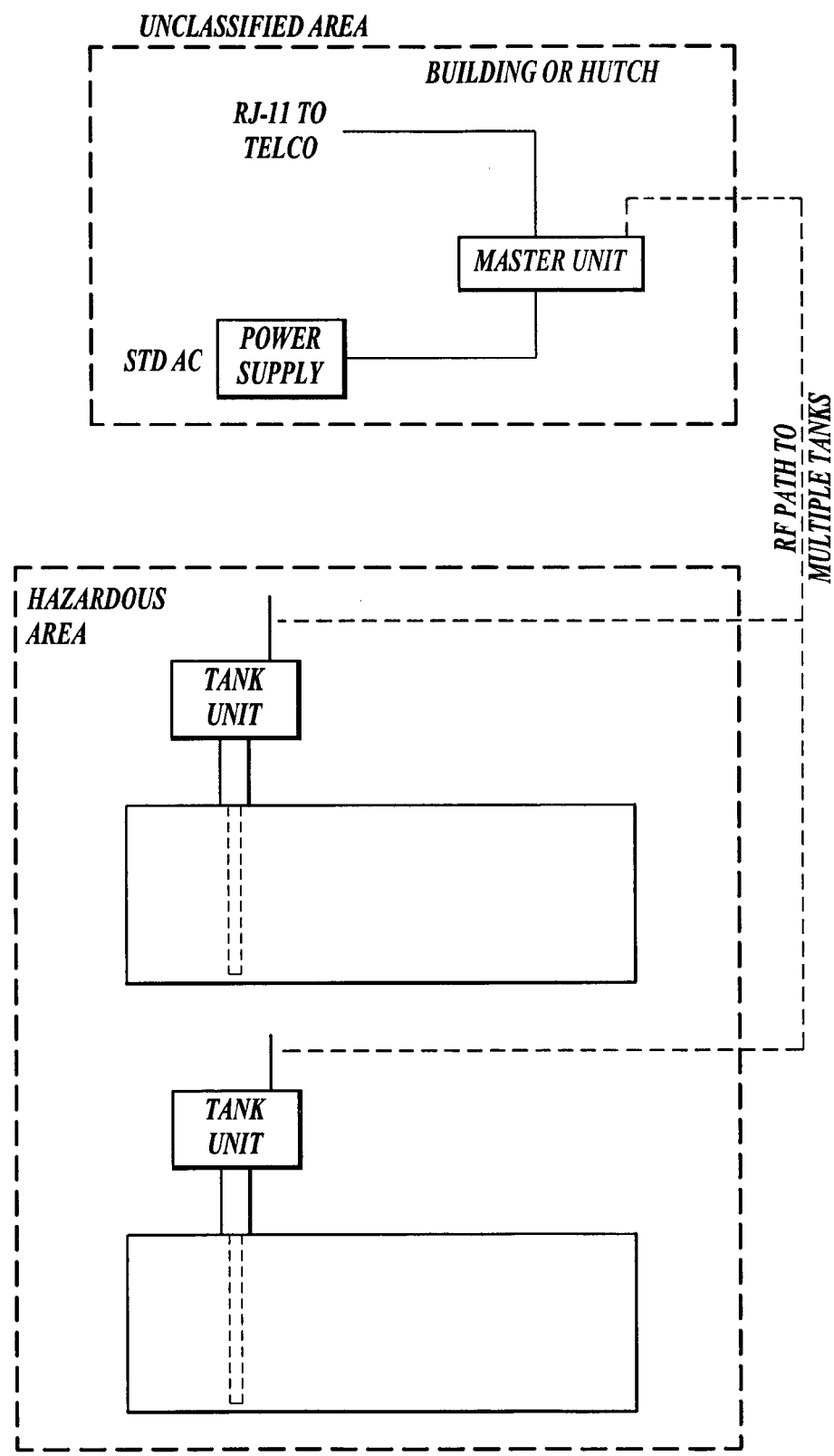
FIG. 6 is a schematic illustration of a monitoring system utilizing the invention.

A suitable arrangement of the monitoring station is depicted in FIG. 6. A plurality of tanks with monitors installed as described above communicate by radio to a master computer housed under roof at a nearby location outside the hazardous zone. In an actual embodiment, the master computer includes a processor (e.g., an ARM-7), flash program memory, non-volatile SRAM memory, a radio for communications to and from control boxes located at different storage tanks, a keypad for operator input, a monitor, a modem, and an output port, such as a RS-232 port. Additional or fewer components may be utilized in configuring the master computer and the above is provided for illustration purposes only. Additionally, the components of the master computer may be located at geographically distinct locations. For example, the radio may be positioned at one location and the master computer located at a separate location. In such a configuration, the radio and master computer may communicate via a wireless or physical connection (e.g., through an RS-485 connection).

The master computer, upon receipt of a transmission from a control box 120 stores the transmission and transmits an acknowledgement to the control box 120 identifying that it has received the transmission. Additionally, if the wake-interval for the transmitting control box is to be adjusted, the master computer may also transmit an adjustment time to the control box 120.

The master computer can be polled periodically by telephone or network (e.g., the Internet) from a remote monitoring station. Of course, when remote downloading is not required, as where an on-site manned facility exists, the data can be accessed directly at the master computer. Indeed, the master computer may be a PC used for office or other functions.

The master computer, for each storage tank that it monitors, stores readings received from a number of past transmissions along with a date and time stamp of each transmission. In an actual embodiment, the readings are stored in raw form (i.e., as received from the control unit). For example, the last 128 transmissions of readings from each monitored storage tank may be stored at the master computer.

The master computer also stores a configuration file 1700 (FIG. 17) that includes information about each monitored storage tank and each of the in-tank sensors within those storage tanks. Referring to FIG. 17, the configuration file 1700 contains, among other items of information, the serial number of the master computer 1701, the maximum number of tanks that may be monitored by the master computer 1703, the actual number of tanks that are being monitored by the master computer 1705, the identification of each of the monitored storage tanks 1707, 1709, the number of modem rings for answering a call from a remote monitoring station 1711, and a password 1713. The configuration file also maintains information about each of the monitored tanks and the equipment located within each tank 1715.

When the master computer is polled for measurements, either from an operator locally accessing the master computer or from a remote monitoring station polling the master computer, it uses the stored readings, computes the requested measurements, transmits (or displays) those measurements, and discards the calculations. For example, if the weight measured by the load cell 70 is requested, the master computer calculates that measurement from the stored raw data as follows:

$$C_{corrected}[counts] = C_{actual}[counts] * m_{tc}[counts/count] + b_{tc}[counts] R_{tc}[counts/count] = C_{corrected}[counts]/1024[counts]$$

Where $C_{actual}$ is the value recorded from the A/D converter, $C_{corrected}$ is the value of the A/D converter corrected for the amplifier, the analog to digital converter particular to that tank and the reference voltage particular to that tank, $m_{tc}$ is the slope of the calibration line for the control unit of the tank, obtained from the configuration file 1700 (FIG. 17), and $b_{tc}$ is the offset of the calibration line for the control unit of that tank, also obtained from the configuration file 1700.

Using those values, the weight is calculated:

$$W[lb] = R_{tc}[cts/ct] * m_{lc}[lb/volt/volt] * (1+T_{cm})[°F./°F.] + b_{lc}[lb] * (1+T_{cb})[[°F./°F.] + FCO[lb]]$$

Where W is the weight measured by the load cell, $m_{lc}$ is the slope of the calibration line for that load cell (in pounds), $b_{lc}$ is the offset of the calibration line (in pounds), $T_m$ is the change in m per °F., $T_b$ is the change in b per °F., and FCO is the Field Calibration Offset in pounds. Additionally:

$$T_{cm} = T_m * (Current\_temp - 60° F.)(Temp\_compensation\_for\_m)$$

$$T_{cb} = T_b * (Current\_temp - 60° F.)(Temp\_compensation\_for\_b)$$

Depending on the load cell used, temperature compensation for the load cell may or may not be necessary.

If the pressure within the tank is requested, the master computer calculates that information using the stored readings as follows:

$$P[psia] = m_{(S)}[psia/volt] * (m_{(A)}[volts/count] * Rdg[Counts] + b_{(A)}[volts]) + b_{(S)}[psia]$$

Where P is the pressure in pounds per square inch absolute (psia), $m_{(S)}$ is the slope of the pressure transducer (sensor) in psi/volt, $m_{(A)}$ is the slope of the amplifier, A/D and voltage reference combination in volts/counts, Rdg is the A/D count, $b_{(A)}$ is the offset of the amplifier, A/D and voltage reference combination in volts, and $b_{(S)}$ is the offset of the pressure transducer (sensor) in psi.

While the above calculations have utilized volts, other variations such as millivolts, microvolts, etc. may also be used. Counts, as referred to above, are the total of the 4,096 readings of the tank's A/D converter divided by 4,096 and used as a floating point value (not an integer).

For more complex calculations that may be performed by the master computer, additional factors must be considered. For example, while the specific gravity for dry air may generally be ignored, the specific gravity of gas vapors, such as liquid petroleum gases may not be ignored. For example, the specific gravity of propane vapor at 60° F. is approximately 0.032. The specific gravity of other liquid petroleum gases is even higher. Thus, if the measurement of the volume of the fluid in a petroleum (LPG) storage tank is requested, the presence of vapor must be taken into account.

Figure 18:
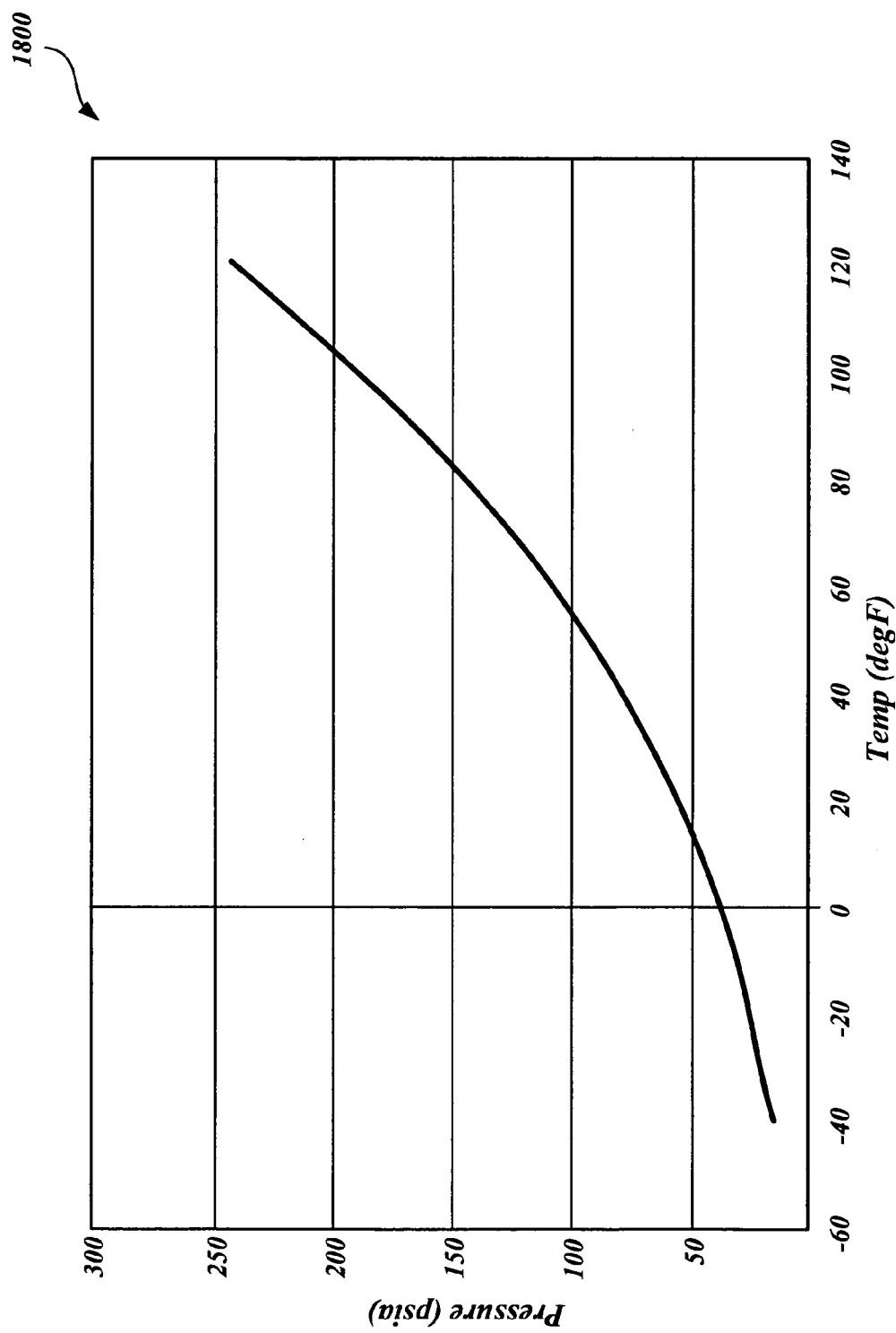
FIG. 18 illustrates a pressure versus temperature curve for pure propane.

From thermodynamics, it is known that a volatile fluid (one that is a vapor at standard temperature and pressure) contained in a pressurized tank will seek a pressure and temperature equilibrium. Using thermodynamics, Charles' Law and Boyle's Law this equilibrium may be more easily considered vapor and liquid equilibrium. FIG. 18 illustrates a pressure versus temperature curve 1800 illustrative of this principle for pure propane. The information depicted in FIG. 18 is publicly available information.

However, as a practical matter, the content of a LPG storage tank is not pure. Normal HD-5 Propane (the highest grade and purity available) has a maximum of ten percent by volume of impurities. Thus, specific gravity of pure propane is not directly valid when computing the volume of the contents of a storage tank. However, as described below, such information may be related to the specific gravity of the product contained in the tank at 60° F. with minor errors. Knowing the specific gravity of the product, the master computer may calculate the density of the product contained in the storage tank.

To relate the specific gravity of the product contained in a storage tank with the publicly available pure data (e.g., FIG. 18), the average density of the fluid (liquid and vapor combination) is calculated based on the volume of the probe (a known number). The measured weight (calculated above), if subtracted from the recorded probe weight and divided by the volume of the probe provides the average density of the fluid (both liquid and vapor). Using the measured temperature with the information from publicly available tables, the master computer can calculate the density of the liquid and vapor components of the fluid.

Additionally, upon request, the master computer can calculate the level of the fluid in the tank using the stored readings obtained from the control box. To accurately calculate the level, compensations may be needed if the tank is not level or if the entry point for the gauge is not vertical. The level of the fluid from the bottom of the tank may be calculated by the master computer as follows:

$$Level = \frac{(\rho_{average} - \rho_{vapor})}{(\rho_{liquid} - \rho_{vapor})} * Length_{probe} + Offset_{probe}$$

Once the level is obtained, correction can be made for the tilt and rotation of a tank, if any is necessary, as shown below:

$$h_r = h + ABS\left(\frac{R * \tan(\phi)}{\cos(\psi)}\right)$$

$$h_{rt} = 2R - \frac{\frac{2R}{\cos(\psi)} - h_r}{\cos(\psi)}$$

$$h_1 = h_{rt} + (L\sin(\psi))$$

$$h_2 = h_{rt} - ((L - S)\tan(\psi))$$

Where h is the uncorrected level of the tank, $h_r$ is the level read from the tank corrected for rotation only, $h_{rt}$ is the level read from the tank corrected for rotation and tilt, $h_1$ is the corrected level at the end of the cylinder (for cylindrical tanks) nearest the probe, $h_2$ is the corrected level at the end of the cylinder furthest from the probe, $\Phi$ is the angle from between the top of the tank and the location of the gauge, $\Psi$ is the angle at which the tank is titled, L is the length of the tank, S is the distance from the end cap weld nearest the probe to the probe, and R is the inside radius of the tank.

The volume of partially filled end cap (modeled as an ellipsoid) near the reference end of the tank (i.e., nearest the probe) may be calculated as follows:

$$V_{e1} = \left(\frac{\pi r}{R}\right)\left(R^2 h_1 - \frac{1}{3}(h_1 - R)^3 - \frac{1}{3}R^3\right)$$

Where r is the inside horizontal radius of the end cap of the tank. Similarly, the volume of the partially filled end cap (also modeled as an ellipsoid) near the far end of the tank may be calculated as follows:

$$V_{e2} = \frac{\pi r}{R}\left(R^2 h_2 - \frac{1}{3}(h_2 - R)^3 - \frac{1}{3}R^3\right)$$

The volume of the partially filled cylinder is calculated as follows:

$$\theta_1 = a r \cos\left(\frac{R - h_1}{R}\right)$$

$$\theta_2 = a r \cos\left(\frac{R - h_2}{R}\right)$$

$$V_c = LR\frac{(\theta_1 R - (R - h_1)\sin\theta_1) + (\theta_2 R - (R - h_2)\sin\theta_2)}{2}$$

Thus, the total volume of a partially filled storage tank is:

$$V_t = V_{e1} + V_{e2} + V_c = \left(\left(\frac{\pi r}{R}\right)\left(R^2 h_1 - \frac{1}{3}(h_1 - R)^3 - \frac{1}{3}R^3\right)\right) +$$

$$\left(\left(\frac{\pi r}{R}\right)\left(R^2 h_2 - \frac{1}{3}(h_2 - R)^3 - \frac{1}{3}R^3\right)\right) +$$

$$\frac{LR((\theta_1 R - (R - h_1)\sin\theta_1) + (\theta_2 R - (R - h_2)\sin\theta_2))}{2}$$

Because the same constants are used for the temperature difference in the density for the calculation of height and to obtain the temperature compensated liquid and liquid content of the vapor, the temperature compensated mass of the fluid may be determined by multiplying the number of cubic inches of fluid at 60° F. (both liquid and liquid content of the vapor) by the specific gravity of the fluid at 60° F. by the density of water at 4° C.

Still further, the temperature of the liquid and the temperature of the vapor (which may be different) can also be calculated by the master computer using the readings stored at the master computer. In particular, because four temperatures in the storage tank are received from the control unit and the ones that are from temperature sensors submerged in fluid are known (from a determination of the level of the fluid), the average temperatures for the liquid and the vapor may be determined.

As will be appreciated by one of skill in the relevant art, additional calculations may be performed by the master computer using the raw data received from the control boxes and stored at the master computer. Additionally, as illustrated below (FIG. 10), the raw data may alternatively be compiled and stored at a central repository and the central repository may be accessed for particular measurements. In such an embodiment, the central repository may perform the function of calculating the requested measurements using data stored at the repository.

Figure 7:
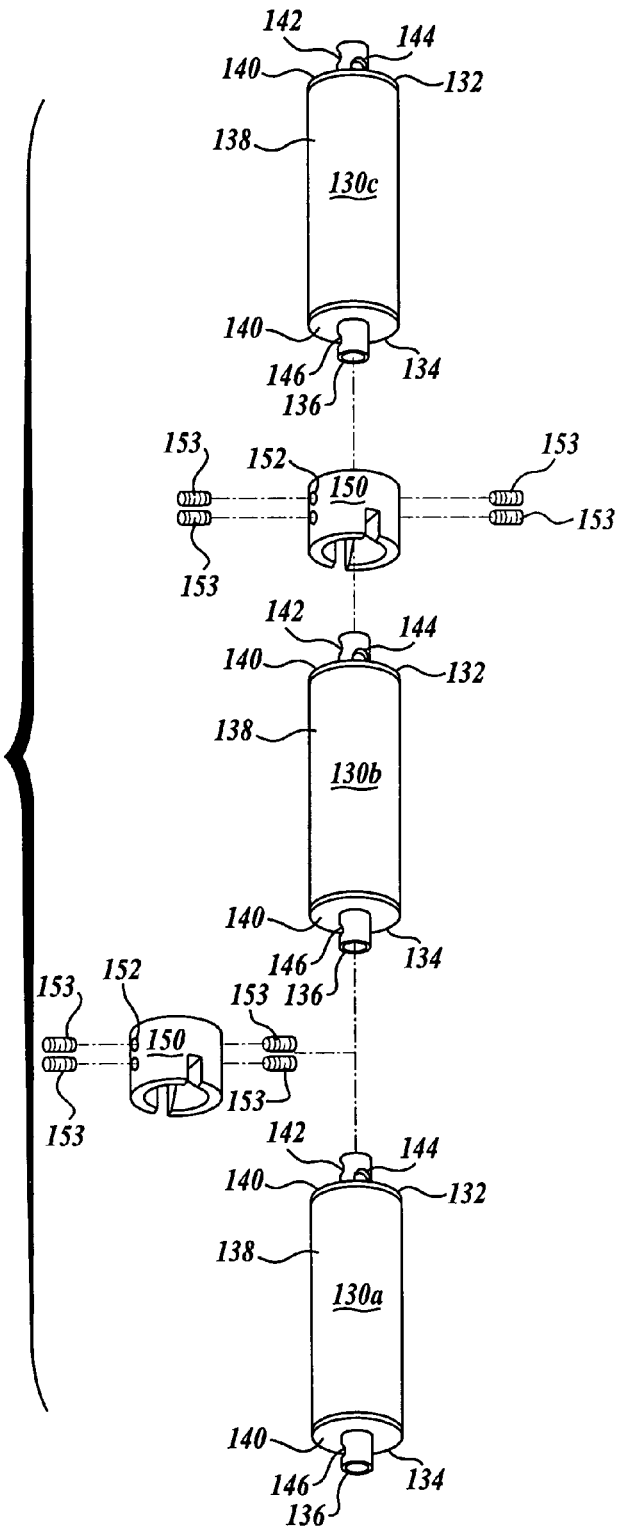
FIG. 7 is an exploded perspective view of a preferred modular form of buoyant displacement probe for use in the system depicted in FIGS. 1 through 6.
Figure 8:
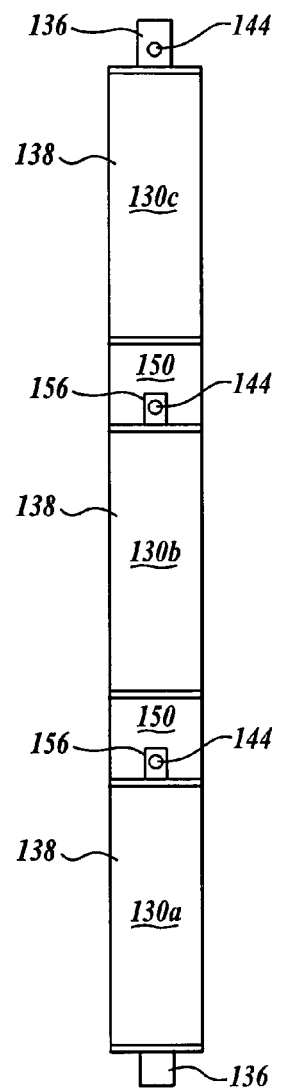
FIG. 8 is a plan view of the assembled probe of FIG. 7.

FIGS. 7 and 8 depict a preferred form of a displacement probe for use in the system described above. This probe, which is in a modular form of discrete plural segments which may be assembled during installation, is especially versatile. In the event that a tank to be monitored is indoors, for example, a probe in this form may be installed even though the vertical clearance above the tank would be insufficient to permit a one-piece probe to be put into place. Also, even in the case of outdoor tanks, the height of the tank may be so great as to make it difficult to handle a one-piece probe of sufficient length for the job. The probe of FIGS. 7 and 8 may be transported in pieces to the job site and assembled during installation of the system.

The modular displacement probe of FIGS. 7 and 8 is comprised of discrete segments 130, which may be substantially identical. The segments are chosen in number and length so that they may easily be handled and connected on site to form the completed probe of FIG. 8 having a length to extend to near the bottom of the tank to be monitored. The illustrated displacement probe is shown with three such segments 130a, 130b and 130c, each of which has an upper end 132 and a lower end 134. Each segment 130 includes a central tube 136 and an outer cylinder 138. The annular void space between each tube 136 and its corresponding outer cylinder 138 is sealed by end caps 140 which join tube 136 and cylinder 138 adjacent each end of segment 130. Tube 132 extends beyond each end cap 140 to provide a location for joining adjacent segments 130 together during installation of the monitor. The portion of each tube 136 at the upper end 132 is provided with a diametrical upper through-hole 142 adjacent its end. A second diametrical through-hole 144 of larger size is formed through tube 132, at an axial location between through-hole 142 and the adjacent end cap 140.

Adjacent the lower end 134 of each segment 130, tube 136 is provided with a diametrical lower through-hole 146, which is oriented so that it is parallel to the upper through-hole 142. Adjacent segments 130 are secured together during installation by a joining collar 150. Collar 150 has a central bore corresponding to the outer diameter of tube 136, so that it slides snugly around tube 136. It is provided with a pair of axially spaced threaded diametrical through-holes 152, which are a match for holes 142 and 146 on each tube 136. Set screws 153 are provided for extending into both ends of the collar holes 152 into the tube 136 at its through-holes 142 and 146. A deep diametrical slot 156 is formed in the lower face of collar 150.

It will be seen that the displacement probe of FIGS. 7 and 8 may be formed in the appropriate number and length of segments 130 and transported to the installation site unassembled. Assembly of the probe and installation proceeds with the lowermost segment 130a first. This segment 130a is extended into the tank through the tank port 12, and through-hole 144 is used to receive the blade of a screwdriver so that the screwdriver may rest on the top of the tank riser 14 and support segment 130a while a joining collar 150 and second segment 130b are secured thereto. This proceeds by sliding collar 150 on the upper end of tube 136, with the slot 156 sliding over the screwdriver blade. Set screws 153 are secured in each end of the lower hole 152 of collar 150, extending into upper through-hole 142 of tube 136 so that the collar is firmly secured to the lowest segment 130a.

With the collar 150 secured in place on the lowest segment 130a, another segment 130b is inserted into the collar so that its tube 136 at its lower end 134 abuts the tube 136 of the lowest segment 130a at the upper end 134 thereof. Set screws 153 are then secured through each end of the higher of the collar threaded holes 152 and into through-hole 146 of segment 130b. With this accomplished, the two segments 130a and 130b are securely joined and form a continuous hollow bore therethrough on the inside of their respective registered tubes 136. The joined assembly can then be lowered further into the tank by removing the screwdriver blade.

The procedure can be repeated identically for each segment 130 to be added to the displacement probe. After all segments have been joined, and the complete probe lowered into the tank, the hole 142 through the tube 136 at the upper end 132 of the uppermost segment (130c in the example illustrated) may be used to suspend the displacement probe from the monitor's load cell. Also, the temperature sensor array may be fed down through the completed probe through its central bore.

The collars 150, in addition to enabling easy assembly of the modular probe on site, contribute to the versatility of the probe design by permitting the user to readily vary the probe weight. The collars 150 may be fabricated to increase the mass of the modular probe for applications in which the tank liquid has a relatively high specific gravity requiring a heavier probe. Where this is the case, the mass of the probe may be readily increased by using a collar material of higher density and/or by using collars of larger outside diameter. This flexibility enables the basic modular probe design to serve for monitoring fluids with a wide range of specific gravities, with simple adjustment to the collar fabrication.

Figure 9:
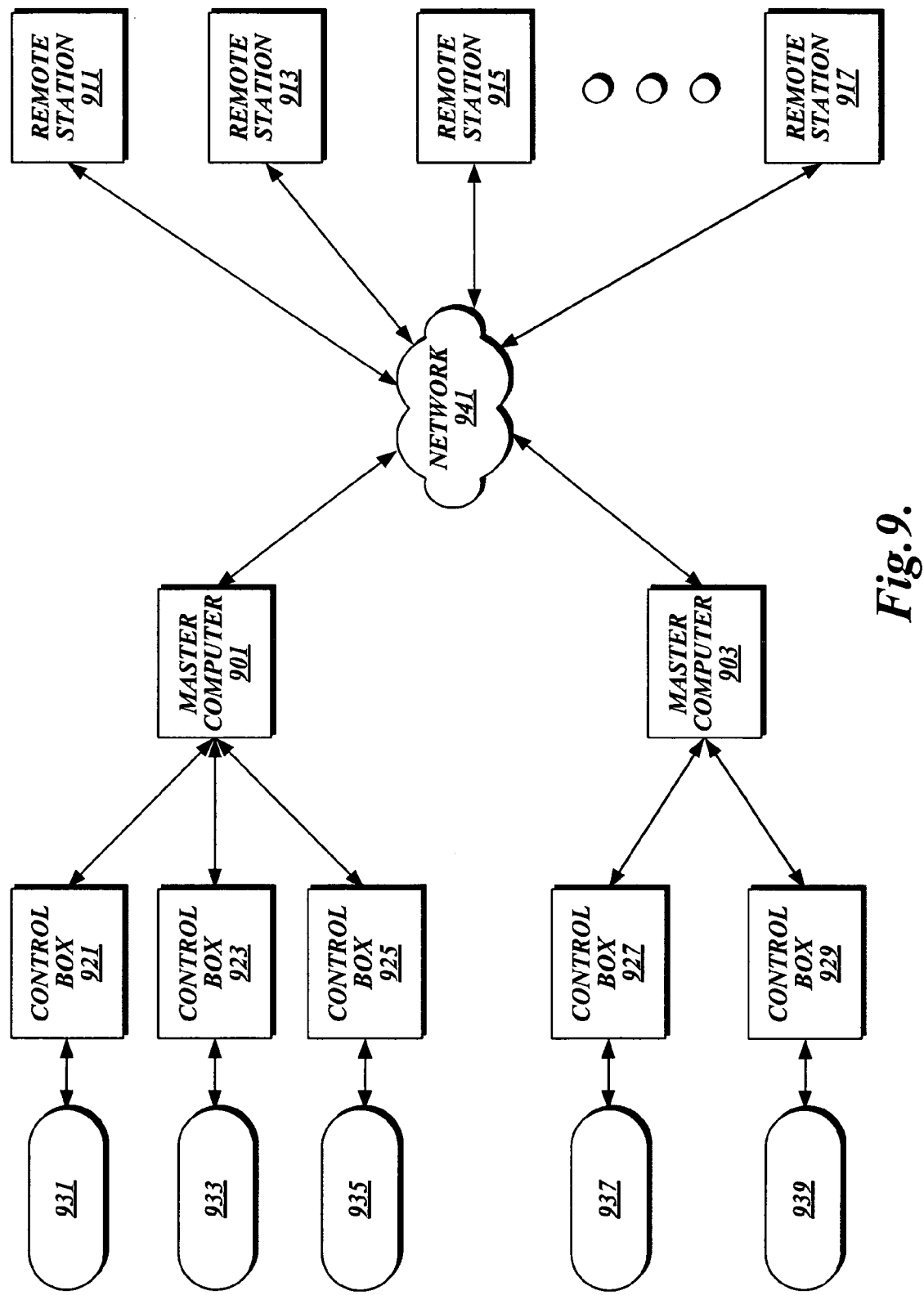
FIG. 9 illustrates a block diagram of an overall system for recording, calculating, transmitting, and storing measurements from a plurality of storage tanks, in accordance with an embodiment of the present invention.

FIG. 9 illustrates a block diagram of an overall system for recording, calculating, transmitting, and storing measurements from a plurality of storage tanks, in accordance with an embodiment of the present invention. For each storage tank 931, 933, 935, 937, 939 there is an accompanying control box, as described above. In particular, storage tank 931 has mounted thereon a control box 921. Likewise, storage tank 933 includes a control box 923, storage tank 935 includes control box 925, storage tank 937 includes control box 927, and storage tank 939 includes control box 929.

As discussed above, each control box is configured to take readings from the in-tank sensors located within its respective storage tank. In operation, the control box wakes up or activates at the predetermined wake interval, takes several readings from each of the in-tank sensors, averages the readings for each sensor, transmits those averaged readings to the master computer, and powers the microprocessor down until the next wake interval.

Referring back to FIG. 9, each control box is associated with a master computer. Each master computer may have one or more control boxes that it monitors and from which it receives data readings. For example, master computer 901 monitors control boxes 921, 923, and 925 and receives data readings from those units taken from the in-tank sensors of storage tanks 931, 933, and 935. Likewise, master computer 903 monitors control boxes 927 and 929 and receives data readings from those units taken from the in-tank sensors of storage tanks 937 and 939. A master computer, upon receipt of a data transmission from one of the control boxes, stores the data transmission in memory, determines if the wake interval for the transmitting control box should be adjusted, and sends an appropriate response. In particular, if the wake interval is to be adjusted, the master computer sends an adjusted wake interval time to the control box, thereby instructing it to adjust its wake interval. However, if it is determined that the wake interval is not to be-adjusted, the master computer simply sends an acknowledgment that it has received the data transmission from the control box.

Each master computer may be at a location distinct from the control boxes that it controls. Alternatively, the master computer may be at the same location as (or nearby) the control boxes that it controls.

Each master computer is capable of being accessed by a remote monitoring station in order to obtain measurements for associated storage tanks. Remote monitoring stations 911–917 may access a master computer in a variety of fashions. For example, a remote monitoring station may have a direct dial telephone number that its modem can dial to connect to the master computer and obtain information. Alternatively, a master computer and one or more remote monitoring stations may be interfaced with a network 941, such as the Internet, and accessible via that network.

Figure 10:
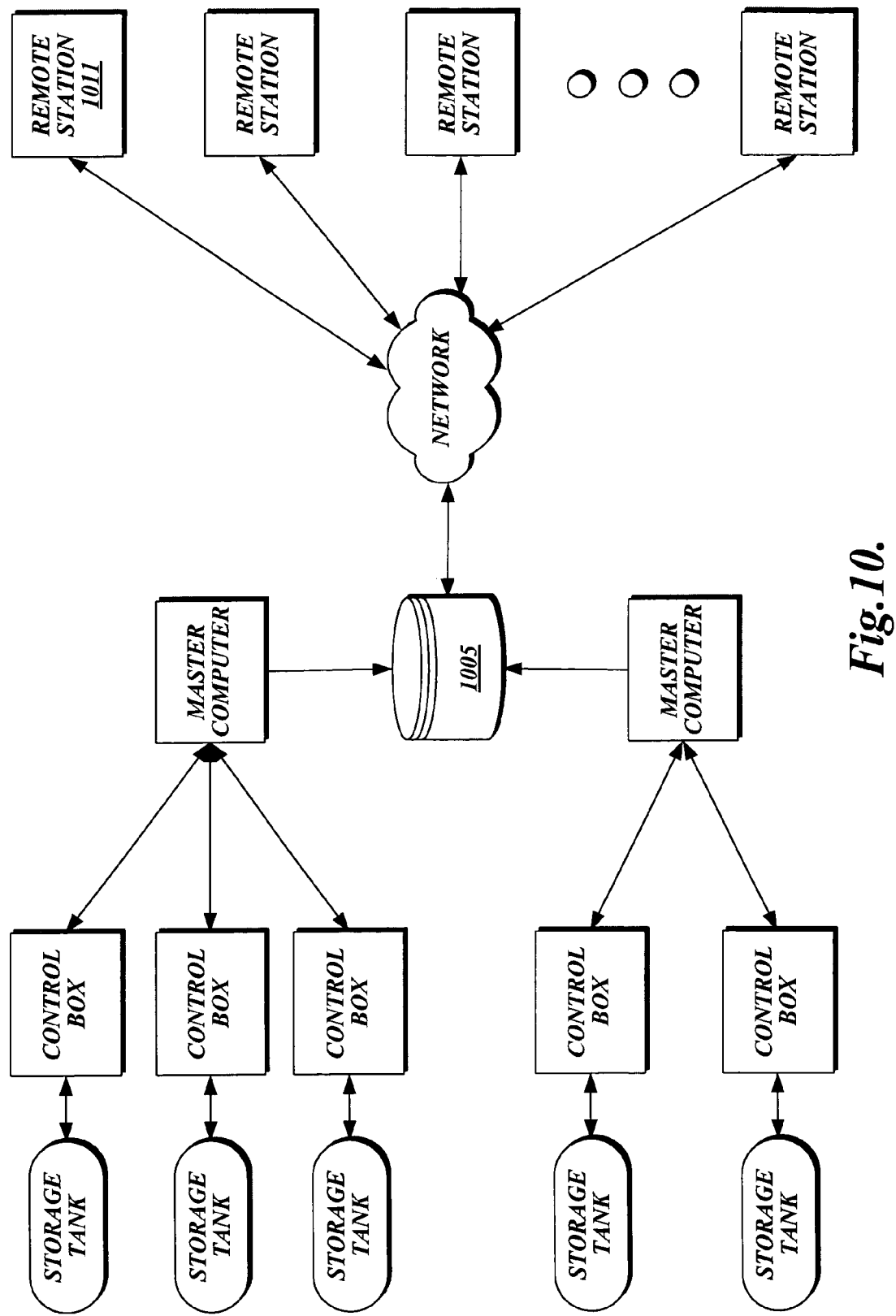
FIG. 10 illustrates an alternative embodiment of a system for monitoring, storing, and transmitting measurements for respective storage tanks, in accordance with an embodiment of the present invention.

FIG. 10 illustrates an alternative embodiment of a system for monitoring, storing, and transmitting measurements for respective storage tanks, in accordance with an embodiment of the present invention. As can be seen with reference to FIG. 9, the embodiment of FIG. 10 is substantially similar with only an addition of a mass storage or database repository 1005. In such an embodiment, each master computer may, in addition to or alternative to storing readings on its own storage device, transmit those readings to a mass storage device or data repository 1005 that is then accessed by the remote monitoring stations to obtain information.

Figure 11A:
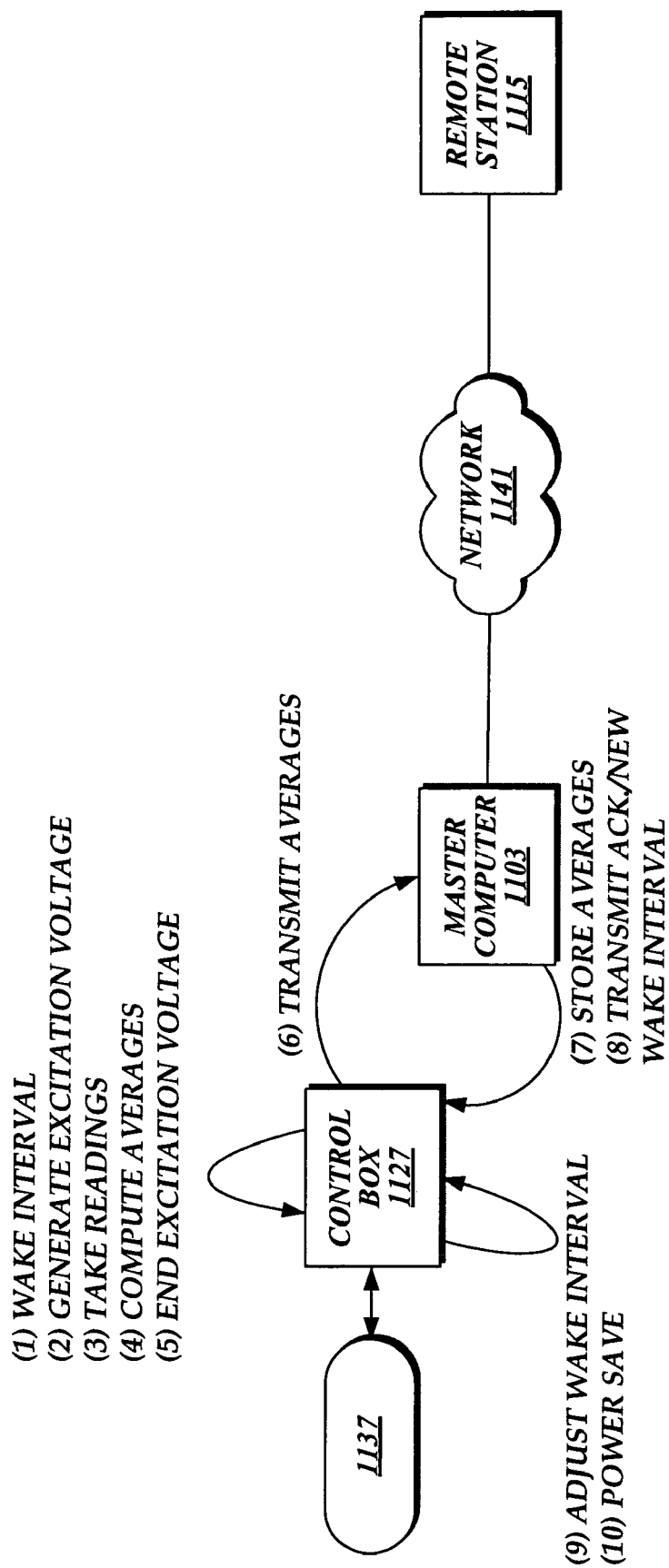
FIG. 11A–11B are state diagrams illustrating the recording, storage, and transmission of data representative of measurements taken from within a storage tank, in accordance with an embodiment of the present invention.
Figure 11B:
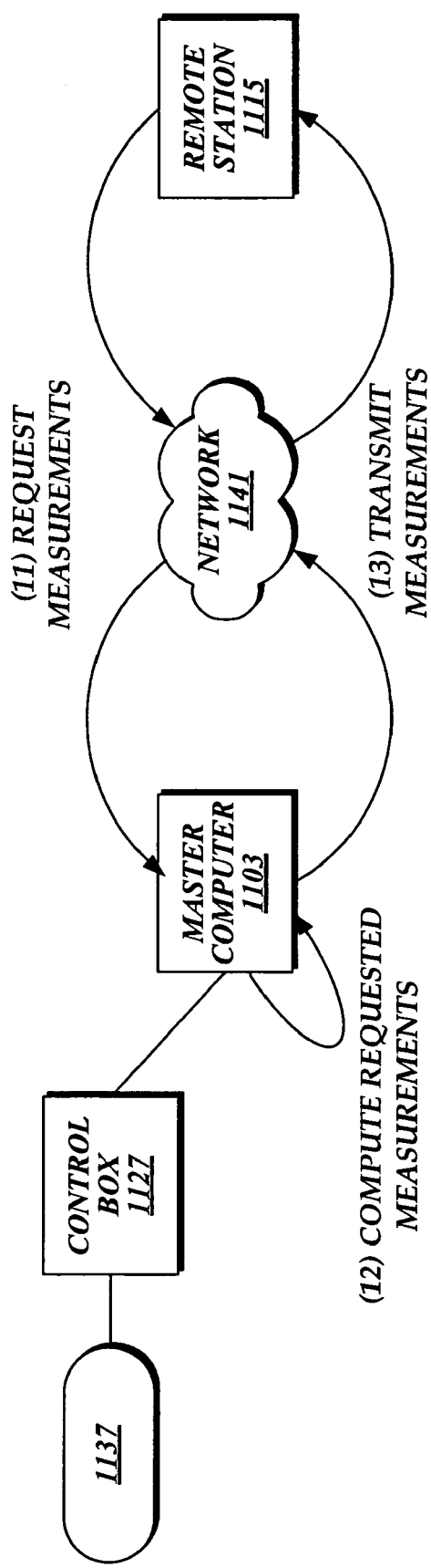

FIGS. 11A–11B are state diagrams illustrating the recording, storage, and transmission of data representative of measurements taken from within a storage tank, in accordance with an embodiment of the present invention. At a wake interval, the control box 1127 wakes up or powers up into an active state, generates an excitation voltage that is used to take readings from the in tank sensors located within the storage tank 1137. The readings from the in tank sensors are recorded by the control box 1127 and an average of those readings is computed. Upon completion of all of the readings, the excitation voltage is terminated. The average readings taken from the in-tank sensors are transmitted from the control box 1127 to a master computer 1103. Additionally, a temperature reading taken from outside the storage tank may also be transmitted from the control box 1127 to a master computer 1103. The master computer stores the averages and transmits an acknowledgment and/or a new wake interval time period back to the control box 1127.

If the control box, upon completion of transmitting its readings, does not receive an acknowledgment and/or a new wake interval from a master computer, it retries its transmission of the recorded averages. This attempted retransmission may be performed any predetermined number of times until a time out period is reached or a select number of retry failures has been reached.

Referring now to FIG. 11B, at some later point in time, a remote monitoring station 1115 requests measurements from the master computer for the storage tank 1137. As will be described below, the remote monitoring station may request measurements for a particular tank, over a particular time period, and for particular types of measurements, such as fluid remaining in the tank, the pressure inside the tank, etc. Master computer 1103, upon receipt of a request for measurements, obtains recorded raw data that is necessary for computing the requested measurements and computes those measurements. Upon completion of computing the requested measurements, master computer 1103 transmits the requested measurements to the remote monitoring station 1115 via a network 1141, such as the Internet, and discards to calculations. Thus, the only information maintained on the master computer 1103 is the raw data itself. If the measurements are requested again at a later point in time, the measurements may be again computed from the raw data and transmitted in response to the request. The remote monitoring station 1115, upon receipt of the transmitted measurements, stores those measurements and displays them to an end user.

Figure 12:
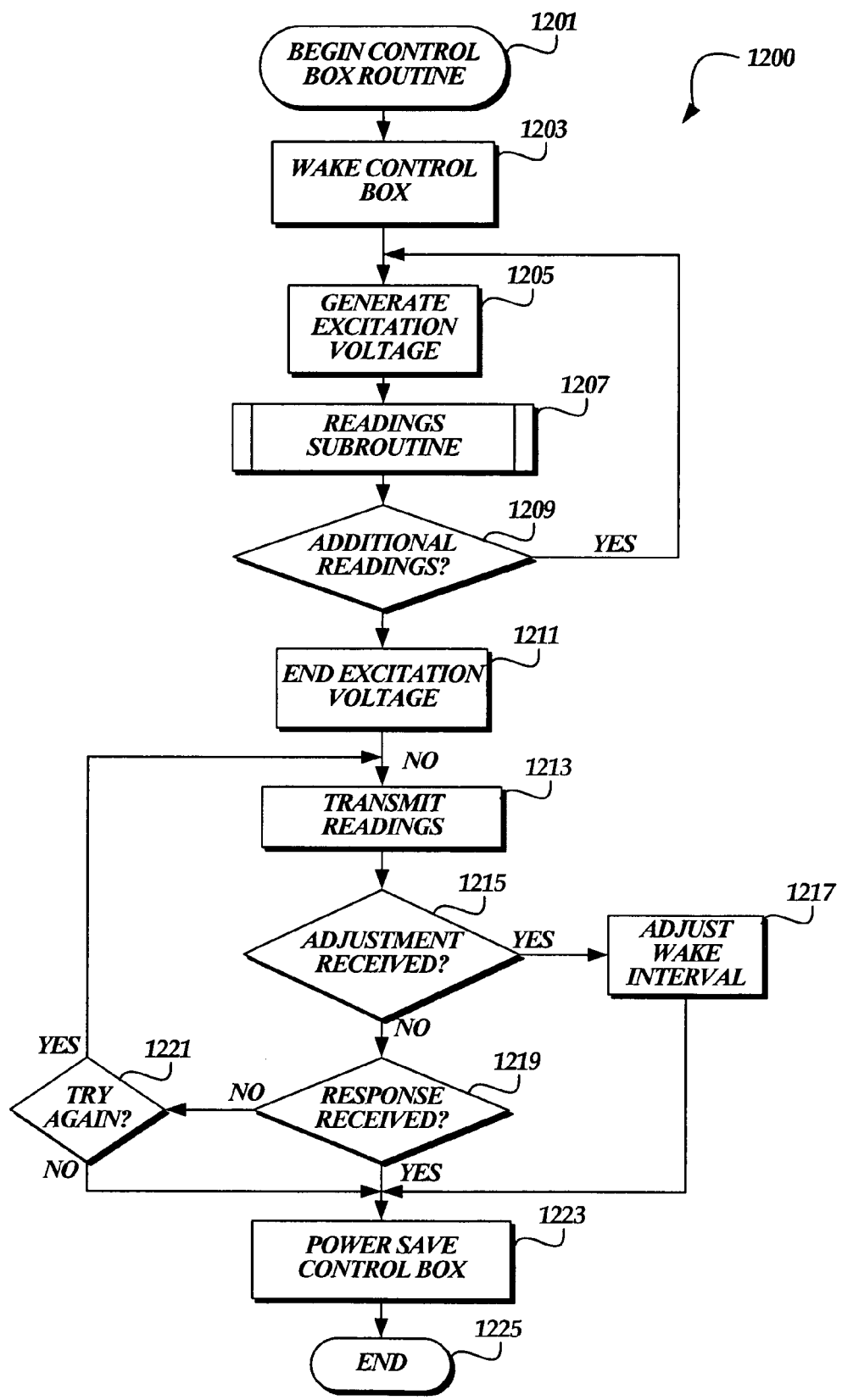
FIG. 12 is a flow diagram illustrative of a control box routine for taking readings from the in-tank sensors and transmitting those readings to a master computer, in accordance with an embodiment of the present invention.

FIG. 12 is a flow diagram illustrative of a control box routine for taking readings from the in-tank sensors and transmitting those readings to a master computer, in accordance with an embodiment of the present invention. The control box routine 1200 begins at block 1201 and at block 1203 the control box powers up its microprocessor into an active state. At block 1205, an excitation voltage is generated that is used for taking readings from the in-tank sensors. The excitation voltage may be any voltage that is capable of being used as a known point from which measurements may be taken. In an actual embodiment of the present invention, the excitation voltage is approximately 5 volts. At block 1207 a reading subroutine is performed, as described with respect to FIG. 13. At decision block 1209 a determination is made as to whether additional readings are to be taken from the in-tank sensors during the power up of the control box. If it is determined at decision block 1209 that additional readings are to be taken, the control box routine 1200 returns to block 1205 and the process repeats. Upon completion of the readings, at block 1211 the excitation voltage is shut off or ended.

Waking the control box 1203, generating the excitation voltage at block 1205, performing the necessary readings at block 1207, and ending the excitation voltage at block 1209 results in an average current pulled from the power supply (e.g., a battery) that is approximately 200 microamps. In standby, the average current is somewhat less than 100 microamps. Waking the control box at predetermined intervals, and initiating and terminating the excitation voltage only during those intervals, extends the life of the control boxes power supply.

At block 1213 the averaged readings obtained from the reading subroutine at block 1207 are transmitted to a master computer. Upon completion of the transmission of the readings at block 1213, at decision block 1215, a determination is made as to whether a wake interval adjustment has been received from a master computer. If it is determined at decision block 1215 that a wake interval adjustment has been received, at block 1217 the predetermined wake interval that is used to wake the control box for performing its readings is adjusted in accordance with the received request.

If it is determined at decision block 1215 that an adjustment to the wake interval has not been received, at decision block 1219 a determination is made as to whether any response has been received in acknowledgement of the readings transmitted at block 1213. If it is determined at decision block 1219 that no response has been received, at decision block 1221 a determination is made as to whether the control box routine 1200 should attempt to retransmit the readings. Determining at decision block 1221 if the control box routine 1200 should again attempt to transmit the readings may be determined based on how many previous attempts have been made. For example, the control box routine may attempt to transmit the same set of readings a maximum of three times.

If it is determined at decision block 1221 that the control box routine 1200 is to attempt to transmit the readings again, control is returned to block 1213 and the routine continues. However, if it is determined at decision block 1221 that the readings are not to be retransmitted again, or if it is determined at decision block 1219 that a response was received in acknowledgement to the transmission of the readings, or an adjustment to the wake interval has been received, at block 1223 the control box powers down the microprocessor and returns to a power saving state (i.e., hibernation). Finally, at block 1225 the control box routine completes.

Figure 13:
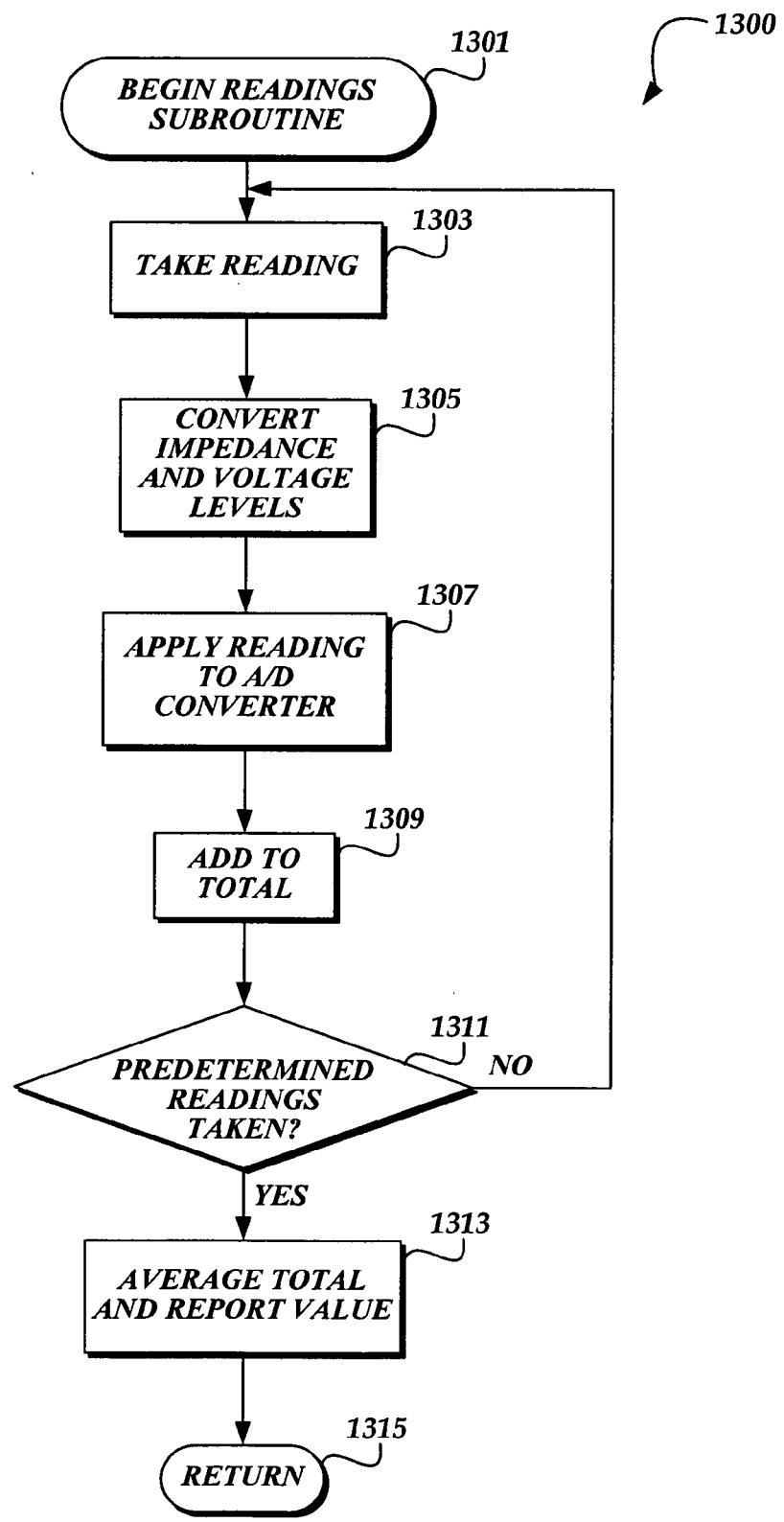
FIG. 13 is a flow diagram of a reading subroutine for taking readings from within the storage tank, in accordance with an embodiment of the present invention.

FIG. 13 is a flow diagram of a reading subroutine 1300 initially represented by subroutine block 1207 in FIG. 12, in accordance with an embodiment of the present invention. The reading subroutine 1300 begins at block 1301 and at block 1303 readings from in-tank sensors are taken. For example, the signal from the load cell is in millivolts per volt of excitation. The full scale value varies from a low of approximately 0.5 millivolts per volt to a high of approximately 3 millivolts per volt, depending on the range of the load cell. Additionally, a very low temperature drift instrument amplifier may be placed in the storage tank to convert the load cell output from a high impedance to a low impedance and from millivolts per volt to a level of approximately 0–2.5 volts. Thus, in an embodiment of the present invention, this instrument amplifier may be one of very high gain (a gain from a low of 131 to a high of 500, depending on the load cell). The amplifier has only a limited bandwidth (zero to approximately 2,000 Hz), an advantage in this case as the signals to not vary significantly during a measurement cycle. A load cell measurement is received in the control box by a second instrument amplifier (not shown) having unity gain. This signal may then be provided to an analog to digital converter ("A/D"). The A/D's reference voltage is the excitation voltage divided by two. Thus, all A/D readings are ratiometric.

The readings taken from the pressure sensor are typically on a range of zero to about 100 millivolts. This signal may be received by another instrument amplifier within the control box with a gain of about 21, placing the signal in the same voltage range as that of the load cell. Again, the A/D reading is ratiometric as the same reference voltage is used. In examples of above ground storage tanks, the pressure input may be used for water level detection.

Referring back to FIG. 13, at block 1305 the reading taken at block 1303 is converted. At block 1307 the converted reading is applied to the A/D converter and at block 1309 the reading is added to a total.

At decision block 1311, a determination is made as to whether the predetermined number of readings have been taken. As discussed above, any selected predetermined number of readings may be identified as to be taken for each reading sequence. For example, readings from the same-in-tank sensor may be taken 4,096 times during one reading routine. If it is determined at decision block 1311 that the predetermined number of readings has not been taken, the routine 1300 returns to block 1303 and continues. However, if it is determined at block 1311 that the predetermined number of readings have been taken, the total of all of those readings computed at block 1309 is averaged and reported, as illustrated by block 1313. At block 1315, the subroutine 1300 completes, returning control to the control box routine 1200 (FIG. 12).

Figure 14:
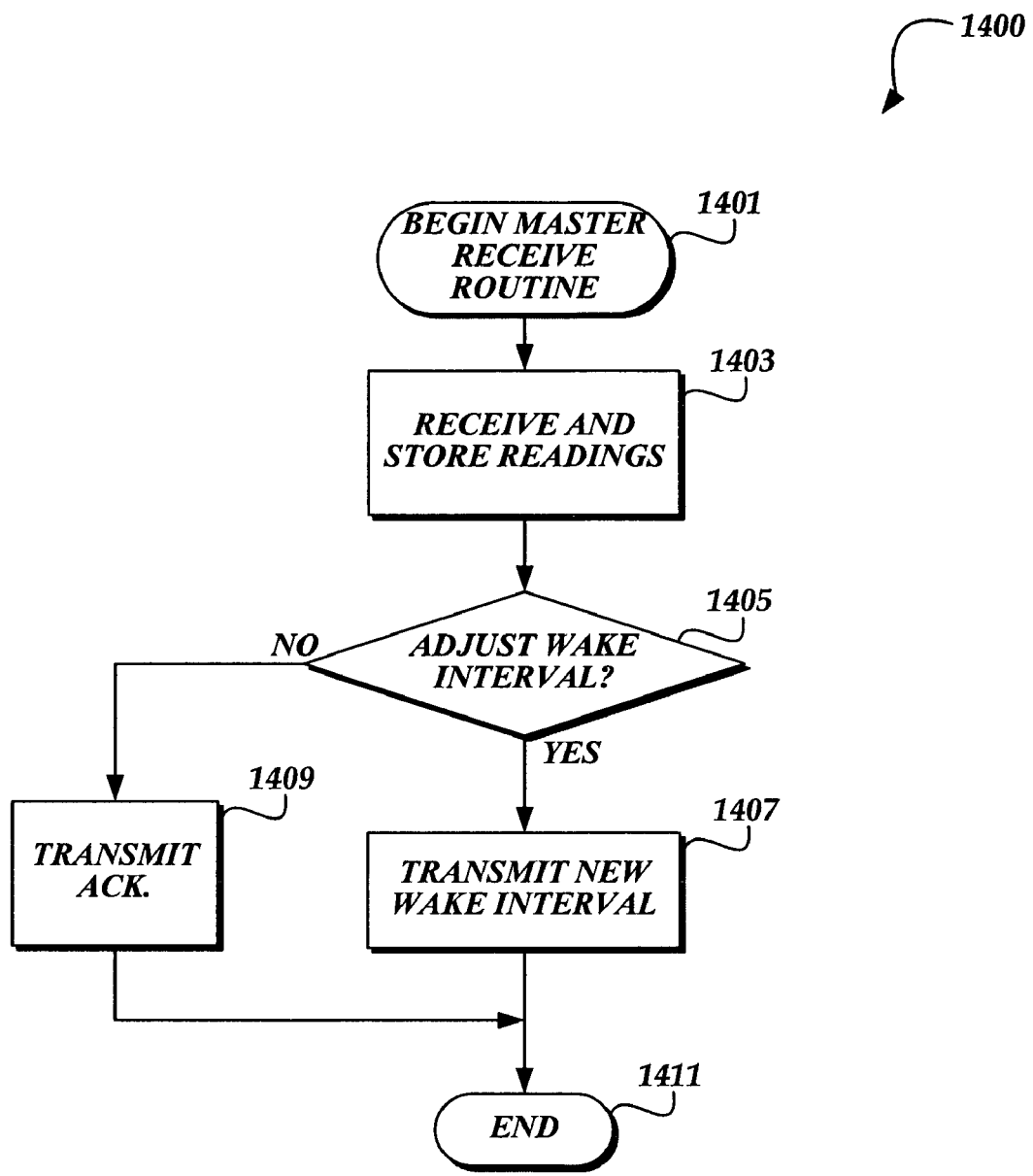
FIG. 14 is a block diagram illustrative of a master receive routine for receiving readings from a control box, in accordance with an embodiment of the present invention.

FIG. 14 is a block diagram illustrative of a master receive routine for receiving readings from a control box, in accordance with an embodiment of the present invention. The master receive routine 1400 begins at block 1401 and at block 1403 the master computer receives a data transmission of readings from a control box and stores those readings in a storage location. As discussed above, the readings may be stored on a storage location contained within the master computer or transmitted to a remote storage location. Once the data transmission has been completed at block 1403, at decision block 1405 a determination is made as to whether to adjust the wake interval for the control box that transmitted the readings. If it is determined at decision block 1405 that an adjustment to the wake interval is desired, at block 1407 a new wake interval time period is transmitted from the master computer to the control box that transmitted the readings. However, if it is determined at decision block 1405 that the wake interval is not to be adjusted, at block 1409 an acknowledgment of receipt of the data transmission is transmitted to the control box. The master receive routine 1400 completes at block 1411.

Figure 15:
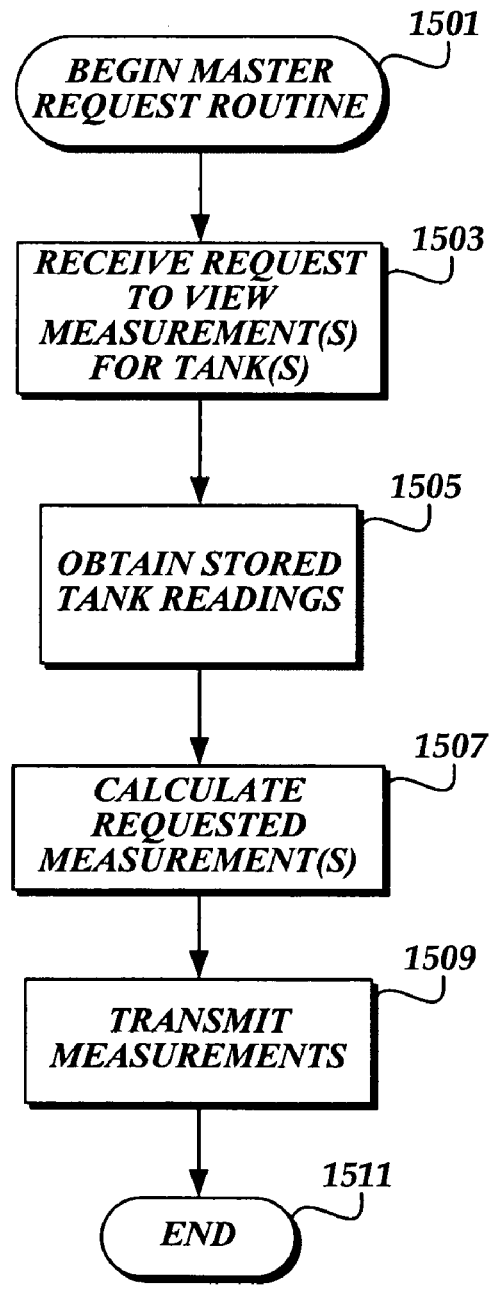
FIG. 15 is a flow diagram of a master request routine performed by a master computer for providing requested measurements to a remote monitoring station, in accordance with an embodiment of the present invention.

FIG. 15 is a flow diagram of a master request routine performed by a master computer for providing requested measurements to a remote monitoring station, in accordance with an embodiment of the present invention. The master request routine 1500 begins at block 1501 and at block 1503 a master computer receives a request to view a measurement or a plurality of measurements for one or more tanks associated with the master computer. In particular, a received request may include an identification of one or more tanks for which a measurement is desired, identification of one or more measurements that are desired, and identification of a time frame for which those measurements for the identified tank are desired. At block 1505 the master computer obtains the stored readings that it previously received from control boxes of the requested tanks that are necessary for calculating the requested measurements (using the calculations discussed above). At block 1507, utilizing the tank readings obtained at block 1505, the master computer calculates the requested measurements, and at block 1509 those measurements are transmitted to the requesting remote monitoring station. The master request routine 1500 completes at block 1511.

Figure 16:
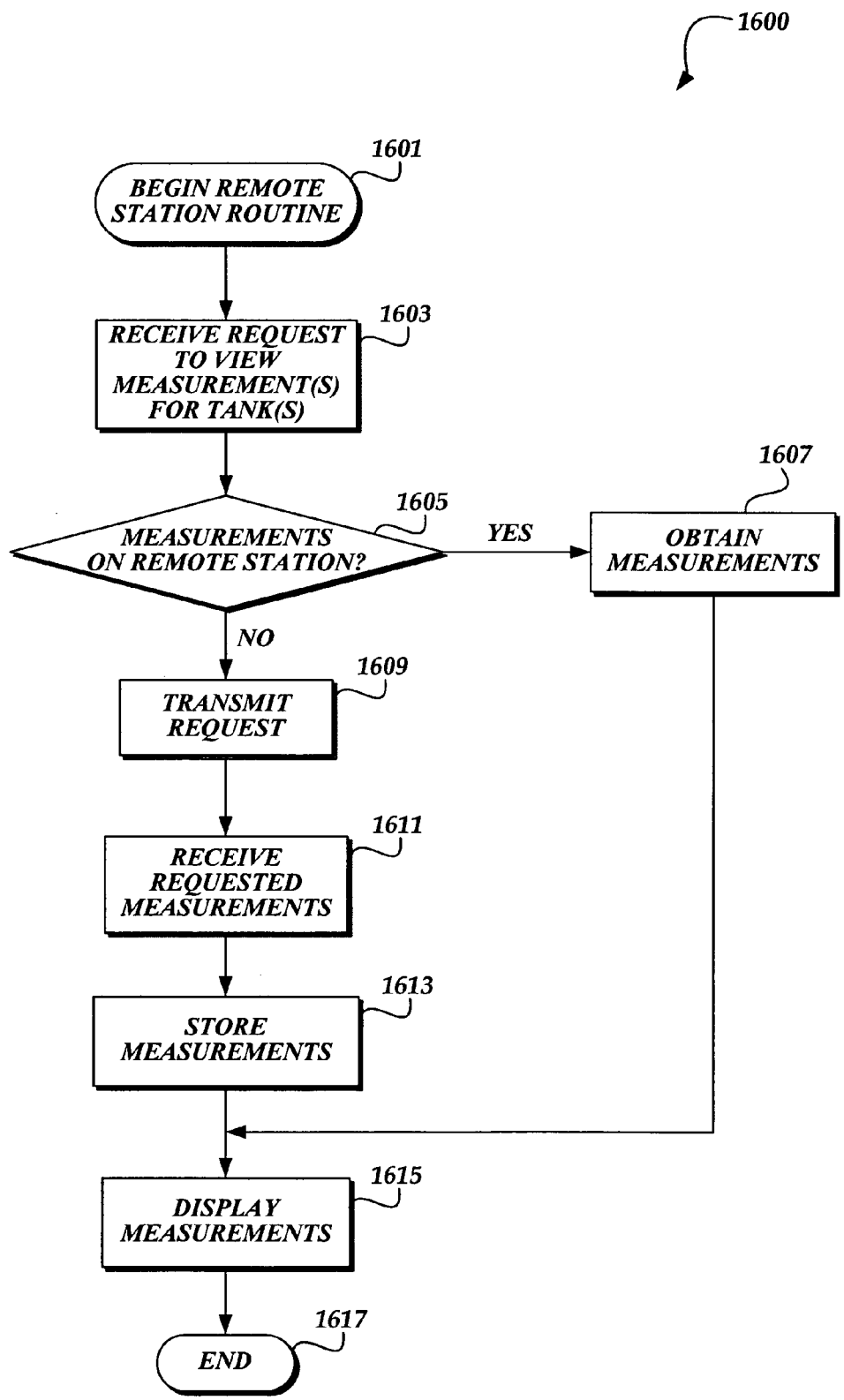
FIG. 16 is a flow diagram illustrative of a remote monitoring station routine for obtaining storage tank measurements and displaying those measurements to an end user, in accordance with an embodiment of the present invention.

FIG. 16 is a flow diagram illustrative of a remote monitoring station routine for obtaining storage tank measurements and displaying those measurements to an end user, in accordance with an embodiment of the present invention. The remote monitoring station routine 1600 begins at block 1601, and at block 1603 a request to review a measurement for one or more tanks is received from an end user. At decision block 1605 a determination is made as to whether the requested measurements are already stored at the remote monitoring station. As discussed above, once measurements have been requested by a remote monitoring station, in addition to displaying those measurements, they are stored at the remote monitoring station. Thus, if those measurements are again requested, the stored measurements are obtained and contact with a master computer is not necessary.

If it is determined at decision block 1605 that the requested measurements are already stored at the remote monitoring station, at block 1607 those measurements are obtained. However, if it is determined at decision block 1605 that the requested measurements are not stored at the remote monitoring station, at block 1609, a request for the measurements for the particular tank over a particular period of time are transmitted to the master computer that monitors the storage tank for which measurements are requested.

At block 1611, in response to a transmitted request, the measurements that are requested are received from the master computer. Those measurements are stored at the remote monitoring station, as illustrated by block 1613. At block 1615, the measurements received at block 1611 or those obtained from storage of the remote monitoring station 1607 are displayed to the end user and the routine 1600 completes at block 1617.

While the embodiments of the invention have been illustrated and described, it will be appreciated that various changes can be made therein without departing from the spirit and scope of the invention. Additionally, while embodiments of the present invention have been described for measuring, reporting and storing measurements taken for storage tanks containing liquid petroleum gases, it will be appreciated by one of skill in the relevant art that embodiments of the present invention are equally applicable to measuring, transmitting, and storing measurement of any type of liquid contained in a storage tank. For example, embodiments of the present invention may be used to measure, transmit, and store measurements for storage tanks containing gasoine, water, milk, oil, or any other liquid.

The embodiments of the invention in which an exclusive property or privilege is claimed are defined as follows:

1. A method for transmitting readings taken from within a storage tank, the method comprising:
   activating a control box at a predetermined time;
   taking a plurality of readings;
   transmitting from the control box the plurality of readings;
   determining if a response was received;
   in response to a determination that a response was received, placing the control box in a power saving state;
   if it is determined that a response was not received, retransmitting the plurality of readings and determining if said response was received after a retransmission;
   if it is determined that a response was received after retransmission, placing the control box in the power saving state; and
   if said response was not received after a predetermined number of retransmissions, placing the control box in the power saving state;
   at the central location, receiving a request for a measurement from a user at a remote location, wherein the request for a measurement identifies a storage tank for which the measurement is desired and a time frame for which the measurement is desired;
   calculating at the central location the measurement based on the request and the plurality of readings; and
   transmitting the calculated measurement from the central location to the remote location.

2. The method of claim 1, wherein taking a plurality of readings includes:
   generating an excitation voltage;
   recording values identifiable as a result of the excitation voltage; and
   ending the excitation voltage.

3. The method of claim 2, wherein the excitation voltage is approximately five volts.

4. The method of claim 1, wherein the readings are a measurement of a weight of a probe located within the storage tank.

5. The method of claim 1, wherein the readings are a measurement of a temperature within the storage tank.

6. The method of claim 1, wherein the readings are a measurement of a plurality of temperatures within the storage tank.

7. The method of claim 1, wherein the readings are a measurement of a pressure within the storage tank.

8. The method of claim 7 wherein the pressure is used to detect a fluid level within the storage tank.

9. The method of claim 1, wherein the plurality of readings are analog readings.

10. The method of claim 9, wherein the plurality of analog readings are applied to an analog-to-digital converter.

11. The method of claim 10, wherein the analog-to-digital conversion provides radiometric readings.

12. The method of claim 1, wherein transmitting the plurality of readings includes:
   averaging a total of the plurality of readings; and
   transmitting the average.

13. A system for providing storage tank measurements to a user at a remote location, the system comprising:
   a control box configured to take a plurality of readings from within a storage tank and transmit those readings;
   a master computer at a central location configured to receive and store the plurality of readings;
   a remote location configured to:
   receive a request from a user to view a measurement for the storage tank, wherein the received request for a measurement identifies the storage tank for which the measurement is desired and a time frame for which the measurement is desired;
   determine if the requested measurement is stored at the remote location;
   in response to determining that the requested measurement is stored at the remote location, displaying the requested measurements to the user at the remote location;
   in response to determining that the .requested measurement is not stored at the remote location, transmitting the request to the master computer at the central location; and
   wherein in response to receiving a request from the remote location for a measurement for the storage tank, the master computer is further configured to:
   calculate the requested measurement utilizing the received and stored readings; and
   transmit the calculated measurement to the remote location.

14. The system of claim 13, wherein the remote location and the master computer are at different geographical locations;
   at a remote location, receiving a request from a user to view a measurement for the storage tank;
   determining if the requested measurement is stored at the remote location;
   in response to determining that the requested measurement is stored at the remote location, displaying the requested measurements to the user at the remote location;
   in response to determining that the requested measurement is not stored at the remote location, transmitting the request to the central location;
   receiving from the central location, a response to the request including the requested measurement calculated at the central location; and
   displaying the requested measurement to the user and storing the requested measurement at the remote location.

15. The system of claim 13, further comprising a second control box configured to take a plurality of readings from within a second storage tank and transmit those readings; and wherein the readings are transmitted to the master computer and stored.

16. The system of claim 13, wherein the master computer stores a plurality of readings received at different points in time.

17. The system of claim 16, wherein the readings are stored in a raw form with a date and a time stamp.

18. The system of claim 13, wherein the calculated measurement is for a weight of a load cell located within the storage tank.

19. The system of claim 13, wherein the calculated measurement is for a pressure within the storage tank.

20. The system of claim 13, wherein the calculated measurement is for a level of liquid within the storage tank.

21. In a computer system having a computer-readable medium including a computer-executable program therein for performing the method of remotely presenting a measurement taken from within a storage tank, the method comprising:
   at a remote location, receiving a request from a user to view a measurement for a storage tank;
   determining if the requested measurement is stored at the remote location;
   in response to determining that the requested measurement is stored at the remote location, displaying the requested measurements to the user at the remote location;
   in response to determining that the requested measurement is not stored at the remote location, transmitting the request to the central location; and
   receiving from the central location, a response to the request including the requested measurement calculated at the central location; and
   displaying the requested measurement to the user and storing the requested measurement at the remote location.

22. The computer system of claim 21, wherein the request to view a measurement identifies the storage tank for which the measurement is desired and a time frame for which the measurement is desired.

23. The computer system of claim 21, wherein the request includes a request to view a plurality of measurements for the storage tank.

24. The computer system of claim 21, wherein the request includes a request to view measurements for a plurality of storage tanks.

25. A system for transmitting readings taken from within a storage tank, comprising:
   a means for activating a control box at a predetermined time, wherein said predetermined time is adjustable;
   a means for taking a plurality of readings from within the storage tank, wherein at least one of those readings determines the amount of fluid contained within the storage tank;
   a means for transmitting the plurality of readings from the control box to a remote location;
   a means for determining if a response was received;
   a means for determining if a command to adjust the predetermined time was received and for adjusting said predetermined time;
   a means for placing the control box in a power saving state at a central location:
   a means for storing the plurality of readings transmitted from the control box;
   a means for receiving a request for a measurement from a user at a remote location, wherein the request for a measurement identifies a storage tank for which the measurement is desired and a time frame for which the measurement is desired;
   a means for calculating at the central location the measurement based on the request and the plurality of readings; and
   a means for transmitting the calculated measurement from the central location to the remote location:

at the remote location:
- a means for receiving a request from a user to view a measurement for the storage tank;
- a means to determine if the requested measurement is stored at the remote location;
- a means for displaying the requested measurement to the user at the remote location in response to a determination that the requested measurement is stored at the remote location;
- a means for transmitting the request to a central location in response to a determination that the requested measurement is not stored at the remote location;
- a means for receiving from the central location, a response to the request including the requested measurement calculated at the central location; and
- a means for displaying the requested measurement to the user and storing the requested measurement at the remote location.

26. The system of claim 25, wherein the means for taking a plurality of readings includes:

- a means for generating an excitation voltage;
- a means for recording a plurality of values identifiable as a result of the excitation voltage;
- a means for averaging the plurality of values; and
- a means for ending the excitation voltage.

27. The system of claim 26, wherein the excitation voltage is approximately five volts.

28. The method of claim 25, wherein the plurality of readings include measurement of a weight of a probe located within the storage tank.

29. The method of claim 25, wherein the plurality of readings include a measurement of a temperature within the storage tank.

30. The method of claim 25, wherein the plurality of readings include a measurement of a pressure within the storage tank.

* * * * *

UNITED STATES PATENT AND TRADEMARK OFFICE
CERTIFICATE OF CORRECTION

PATENT NO. : 7,209,865 B2  Page 1 of 1
APPLICATION NO. : 11/027382
DATED : April 24, 2007
INVENTOR(S) : R.C. Scott et al.

It is certified that error appears in the above-identified patent and that said Letters Patent is hereby corrected as shown below:

| COLUMN | LINE | ERROR |
|---|---|---|
| 16 (Claim 1, | 21 line 5) | "box the plurality" should read --box to a central location the plurality-- |
| 18 (Claim 25, | 55 line 16) | begin a new paragraph with "at a central location" |
| 18 (Claim 25, | 65 line 26) | "readings; and" should read --readings;-- |

Signed and Sealed this

Fifteenth Day of July, 2008

JON W. DUDAS
*Director of the United States Patent and Trademark Office*